Patented Mar. 20, 1934

1,951,728

UNITED STATES PATENT OFFICE 1,951,728

MANUFACTURE OF SHEET MATERIAL

Albert C. Fischer, Chicago, Ill., assignor to The Philip Carey Manufacturing Company, a corporation of Ohio No Drawing. Application July 30, 1925, Serial No. 47,172

7 Claims. (Cl. 106—31)

My sheet material is adapted for use as an expansion joint, roofing, floor covering, siding, etc., and consists primarily of a mixture of ductile substances and fibrous matter in varying proportions and in varying shapes and forms. The fibrous material may consist of broom corn, cocoanut fibre, sisal, excelsior, either in the broad ribbon form or narrow form, in fact any fibrous matter which can be penetrated by an oily substance or a substance which cannot be driven off readily under a temperature of 250°.

When fibrous matter is saturated with moisture and the mixture is raised to a temperature over the boiling point of the water, namely 212°, the fibrous matter losing its moisture content becomes brittle and therefore loses its binding strength.

My invention relates to the treating of this fibrous matter with an oily substance, for instance impregnating the same with cotton seed oil and then pressing the fibre to remove all surplus oil so that the actual fibrous matter will only retain the oily content, and allowing the cells in the fibre to be unfilled. Such other substances as wood oil, castor oil, glycerine, soap solution or any combination of greasy or oily substances which will suitably impregnate the material, may be employed. I find that the impregnation with oil strengthens the fibrous matter the same as water, but is not driven off at low temperatures such as occurs when water is employed.

I also wish to preserve in so far as possible the cellular construction unfilled, so as to obtain the benefit of the resiliency of the unfilled fibrous cells.

These substances may be treated with sulphur chloride, sulphur or other thickening chemicals which will cause the oily substance to thicken and become dense in the fibrous structure. This fibre is then mixed with asphalt, either in the blown or untreated state, or any other suitable ductile substance such as asphalt rubber combinations, rosin rubber combinations, etc.

The sulphur chloride, or other suitable treating compound, may be used to merely give a trace of the chloride to the impregnating oil, and after expressing the oil from the fiber this trace will remain in with the fiber and the oil, and when this fiber is later mixed with a bituminous material at a considerable heat the sulphur chloride will have a tendency to thicken the oil and further strengthen the fiber, or, if the fiber, by the use of certain oils has a tendency to slip too much because of the lack of adhesiveness, then by treating the oil with sulphur chloride it can be made more adhesive by thickening it, and it would still under heat make the oil sufficiently thin to waterproof the fiber without clogging the pores, which would also toughen the fibers and lend greater adhesiveness to the fiber in its amalgamation with the waterproofed binder. For instance, cottonseed oil might be used, which is a very fluid liquid oil, and it might be desirable to thicken it somewhat to destroy any tendency which might continue the fiber in too moist a state. In other words, if too thin an oil is used in conjunction with certain fibers it may be difficult to express all of the oil that might be wished to express, and if the flow of the oil is regulated, which can be done by sulphur chloride, these liquid and thorough saturating tendencies would be more or less regulated.

A simple formula would be 10% ribbon excelsior impregnated with crude cotton seed oil thoroughly pressed between rolls to remove the surplus oil, then mixed with 90% blown asphalt having a melting point of approximately 240° and a penetration of 32°, approximating 19°.

This compound is thoroughly mixed, rolled into sheets of various thicknesses for the purpose required. To this formula may be added sulphur sufficient to thicken the oily substance under the heating process or any other suitable chemical which would tend to thicken or set the oil in the fibre.

I claim:—

1. The herein described method of preparing resilient construction materials, which consists in impregnating fibrous material with a liquid substance having the inherent qualities of rendering the material supple, removing a predetermined quantity of said substance to leave the cellular structure of the material unfilled and thereafter incorporating the material thus treated with a compressible plastic binder.

2. The herein described method of preparing resilient construction materials, which consists in impregnating fibrous material with an oily substance, having the inherent qualities of rendering the material supple, pressing said material between rolls to express a predetermined quantity of said substance to leave the cellular structure of the material unfilled, and thereafter incorporating the treated material with a compressible plastic binder.

3. The herein described method of preparing elastic construction materials, which consists in impregnating fibrous material with an oily substance, having the inherent qualities of rendering the material supple, pressing said material between rolls to express a predetermined quantity of said substance to leave the cellular structure of the material unfilled, and thereafter incorporating the treated fibrous material with a ductile plastic binder, heated below a temperature at which said oily substance will volatilize.

4. The herein described method of preparing elastic construction materials, which consists in impregnating a dry fibrous material with an oily substance mixed with a sulphur compound, which, when placed in a heated condition, will thicken the oily substance, and thereafter mixing said treated material with a ductile plastic substance at a high temperature, but beneath that at which the oily substance will volatilize.

5. The method of preparing resilient construction material, which consists in impregnating fibrous material with an oily substance having the inherent qualities of rendering the material supple, treating the material with sulphur chloride to thicken the oily substance, pressing said material to express a predetermined quantity of said substance to leave the cellular structure of the material unfilled, and thereafter incorporating the treated material with a compressible plastic binder.

6. The method of preparing expansion joint composition characterized by impregnating fibrous material with a liquid substance having the inherent qualities of rendering the material supple, removing a quantity of the impregnating liquid to leave the cellular structure of the fibrous material unfilled, and incorporating the impregnated fibrous material with a compressible plastic binder.

7. The method of preparing expansion joint composition characterized by impregnating fibrous material with an oily substance having the inherent qualities of rendering the material supple, removing a quantity of the impregnating liquid to leave the cellular structure of the fibrous material unfilled, and incorporating the impregnating fibrous material with a bituminous binder.

ALBERT C. FISCHER.